US011489210B2

(12) United States Patent
Chou et al.

(10) Patent No.: US 11,489,210 B2
(45) Date of Patent: Nov. 1, 2022

(54) ELECTRONIC DEVICE AND METHOD FOR SUPPRESSING BATTERY SWELLING

(71) Applicant: Acer Incorporated, New Taipei (TW)

(72) Inventors: Shuo-Jung Chou, New Taipei (TW); Chuan-Jung Wang, New Taipei (TW); Chih-Chiang Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 13 days.

(21) Appl. No.: 17/243,788

(22) Filed: Apr. 29, 2021

(65) Prior Publication Data

US 2022/0271351 A1    Aug. 25, 2022

(30) Foreign Application Priority Data

Feb. 25, 2021 (TW) .................................. 110106685

(51) Int. Cl.
*H01M 10/44* (2006.01)
*H02J 7/00* (2006.01)

(52) U.S. Cl.
CPC .......... *H01M 10/44* (2013.01); *H02J 7/0047* (2013.01)

(58) Field of Classification Search
CPC .............................. H01M 10/44; H02J 7/0047

USPC .......................................................... 320/162
See application file for complete search history.

(56) References Cited

U.S. PATENT DOCUMENTS

| 2006/0093896 | A1  | 5/2006 | Hong et al. | |
| 2016/0064780 | A1* | 3/2016 | Jarvis | H01M 10/48 429/61 |
| 2020/0119389 | A1* | 4/2020 | Liang | H01M 4/667 |

OTHER PUBLICATIONS

Chinese language office action dated Sep. 29, 2021, issued in application No. TW 110106685.

* cited by examiner

*Primary Examiner* — Nathaniel R Pelton
(74) *Attorney, Agent, or Firm* — McClure, Qualey & Rodack, LLP

(57) ABSTRACT

An electronic device for suppressing battery swelling includes a first battery cell, a first conductive label, a second conductive label, a third conductive label, and a BMU (Battery Management Unit). The first battery cell includes a first nonconductive housing. The first conductive label, the second conductive label, and the third conductive label are disposed on the first nonconductive housing. The BMU outputs a charging voltage to the first battery cell. The BMU determines the voltage level of the charging voltage by detecting the states of the first conductive label, the second conductive label, and the third conductive label.

9 Claims, 7 Drawing Sheets

ELECTRONIC DEVICE AND METHOD FOR SUPPRESSING BATTERY SWELLING

CROSS REFERENCE TO RELATED APPLICATIONS

This Applications claims priority of Taiwan Patent Application No. 110106685 filed on Feb. 25, 2021, the entirety of which is incorporated by reference herein.

BACKGROUND OF THE INVENTION

Field of the Invention

The disclosure generally relates to an electronic device, and more specifically, to an electronic device for suppressing battery swelling.

Description of the Related Art

Notebook or tablet computers usually require battery components. However, after a long period of use, the battery may swell without warning and may damage the computer device. Accordingly, there is a need to propose a novel solution for solving the problems of the prior art.

BRIEF SUMMARY OF THE INVENTION

In a preferred embodiment, the invention is directed to an electronic device for suppressing battery swelling. The electronic device includes a first battery cell, a first conductive label, a second conductive label, a third conductive label, and a BMU (Battery Management Unit). The first battery cell includes a first nonconductive housing. The first conductive label, the second conductive label, and the third conductive label are disposed on the first nonconductive housing. The BMU outputs a charging voltage to the first battery cell. The BMU determines the voltage level of the charging voltage by detecting the states of the first conductive label, the second conductive label, and the third conductive label.

In another preferred embodiment, the invention is directed to a method for suppressing battery swelling. The method includes the steps of: providing a first battery cell, a first conductive label, a second conductive label, and a third conductive label, wherein the first conductive label, the second conductive label, and the third conductive label are disposed on a first nonconductive housing of the first battery cell; detecting the states of the first conductive label, the second conductive label, and the third conductive label by a BMU (Battery Management Unit), so as to determine a voltage level of a charging voltage; and outputting the charging voltage to the first battery cell by the BMU.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
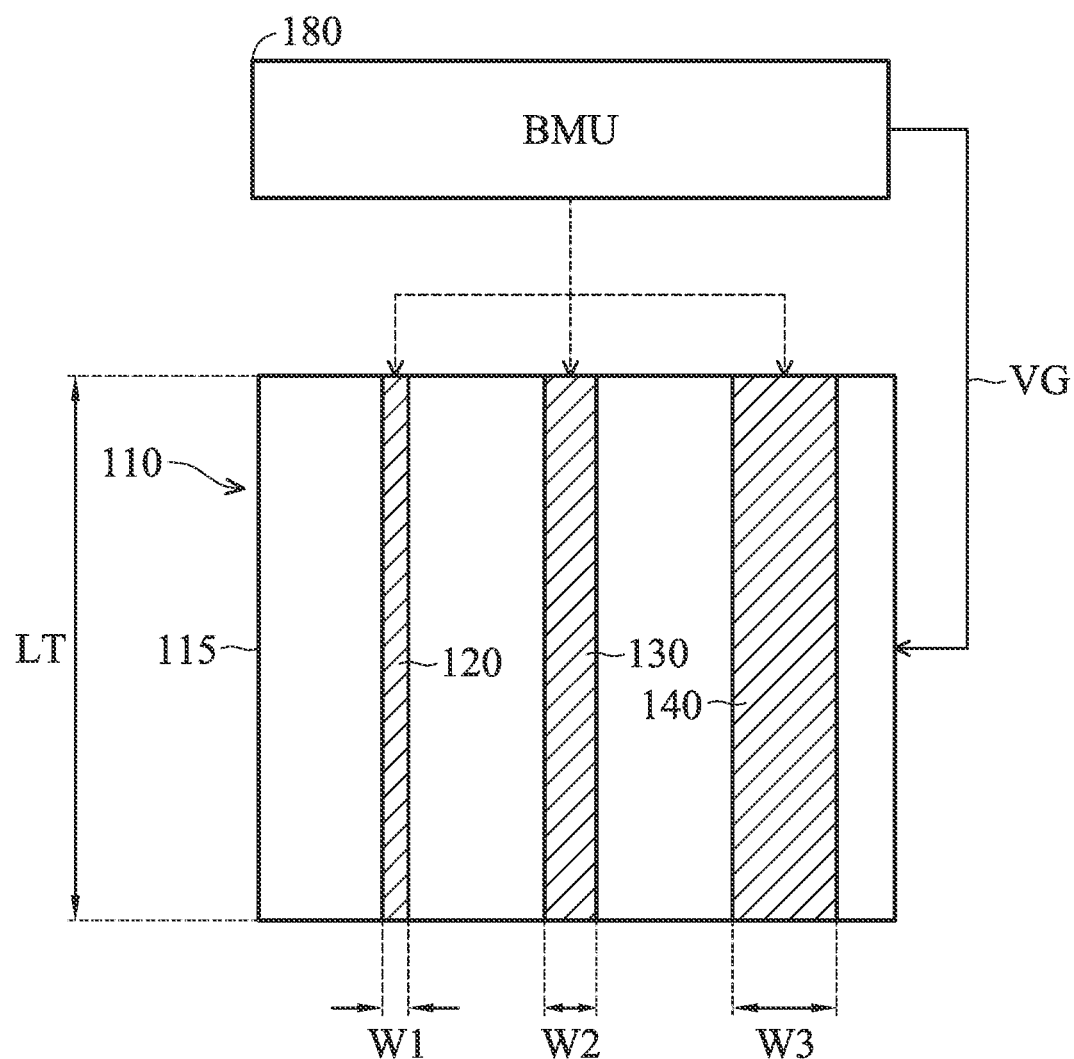
FIG. 1 is a diagram of an electronic device according to an embodiment of the invention.

FIG. 1 is a diagram of an electronic device 100 according to an embodiment of the invention. The electronic device 100 may be applied to a mobile device, such as a smart phone, a tablet computer, or a notebook computer. As shown in FIG. 1, the electronic device 100 at least includes a first battery cell 110, a first conductive label 120, a second conductive label 130, a third conductive label 140, and a BMU (Battery Management Unit) 180. It should be noted that the electronic device 100 may further include other components, such as a display device, a speaker, a touch control module, and a housing, although they are not displayed in FIG. 1.

The first battery cell 110 includes a first nonconductive housing 115, whose shape and size are not limited in the invention. The first conductive label 120, the second conductive label 130, and the third conductive label 140 are all disposed on the first nonconductive housing 115. Each of the first conductive label 120, the second conductive label 130, and the third conductive label 140 may substantially have a straight-line shape. In some embodiments, the first conductive label 120, the second conductive label 130, and the third conductive label 140 have the same lengths LT and different widths W1, W2 and W3. For example, the width W3 of the third conductive label 140 may be greater than the width W2 of the second conductive label 130, and the width W2 of the second conductive label 130 may be greater than the width W1 of the first conductive label 120, but they are not limited thereto. The BMU 180 can output a charging voltage VG to the first battery cell 110. It should be noted that the BMU 180 can determine the voltage level of the charging voltage VG by detecting the states of the first conductive label 120, the second conductive label 130, and the third conductive label 140. Since the states of the first conductive label 120, the second conductive label 130, and the third conductive label 140 can indicate the SOH (State of Health) of the first battery cell 110, the BMU 180 can provide the charging voltage VG at an appropriate level, which is configured to effectively suppress the non-ideal swelling of the first battery cell 110 and maximize the service life of the first battery cell 110.

The following embodiments will introduce the detailed structure and operation of the electronic device 100. It should be understood these figures and descriptions are merely exemplary, rather than limitations of the invention.

Figure 2:
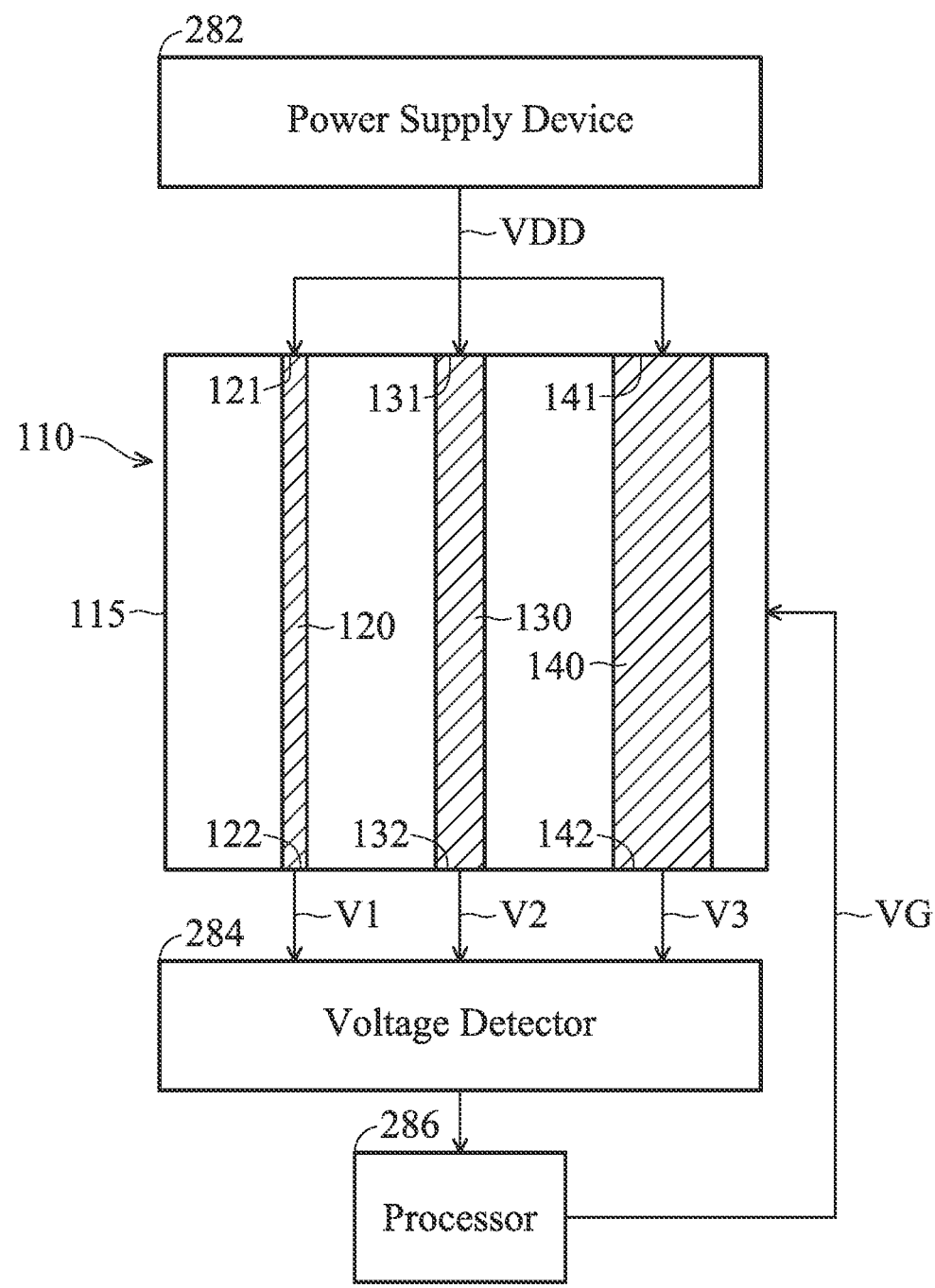
FIG. 2 is a diagram of an electronic device according to an embodiment of the invention.

FIG. 2 is a diagram of an electronic device 200 according to an embodiment of the invention. FIG. 2 is similar to FIG. 1. In the embodiment of FIG. 2, a BMU 280 of the electronic device 200 includes a power supply device 282, a voltage detector 284, and a processor 286. The power supply device 282 can output a supply voltage VDD to a first terminal 121 of the first conductive label 120, a first terminal 131 of the second conductive label 130, and a first terminal 141 of the third conductive label 140. The supply voltage VDD represents a high logic level (e.g., a logic "1"). The voltage detector 284 can detect a first voltage V1 at a second terminal 122 of the first conductive label 120, a second voltage V2 at a second terminal 132 of the second conductive label 130, and a third voltage V3 at a second terminal 142 of the third conductive label 140. Next, the processor 286 can generate the charging voltage VG and adjust its voltage level according to the first voltage V1, the second voltage V2, and the third voltage V3. Other features of the electronic device 200 of FIG. 2 are similar to those of the electronic device 100 of FIG. 1. According, the two embodiments can achieve similar levels of performance.

In some embodiments, the processor 286 determines whether any of the first conductive label 120, the second conductive label 130, and the third conductive label 140 is broken by analyzing the first voltage V1, the second voltage V2, and the third voltage V3. Specifically, the states of the first conductive label 120, the second conductive label 130, and the third conductive label 140 include a first combination, a second combination, a third combination, and a fourth combination, which will be described as follows.

Figure 3A:
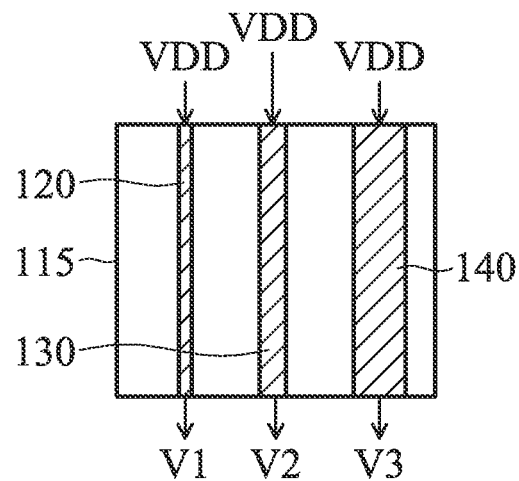
FIG. 3A is a diagram of a first combination of conductive labels according to an embodiment of the invention.

FIG. 3A is a diagram of the first combination of the conductive labels according to an embodiment of the invention. In the embodiment of FIG. 3A, the first battery cell 110 has not swollen at all, such that none of the first conductive label 120, the second conductive label 130, and the third conductive label 140 is broken. At this time, the first voltage V1, the second voltage V2, and the third voltage V3 all have high logic levels. In response to the first combination, the processor 286 can set the charging voltage VG to the original level (e.g., 4.45V).

Figure 3B:
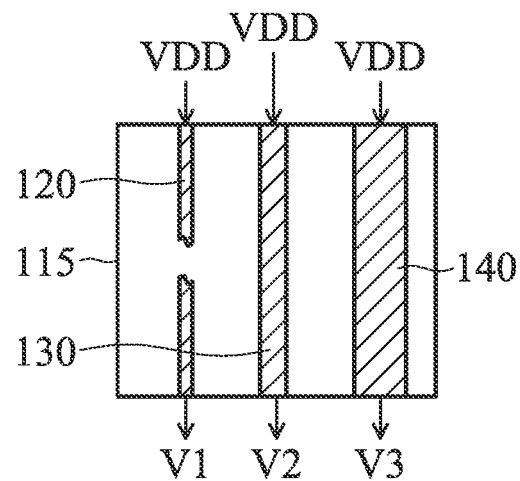
FIG. 3B is a diagram of a second combination of conductive labels according to an embodiment of the invention.

FIG. 3B is a diagram of the second combination of the conductive labels according to an embodiment of the invention. In the embodiment of FIG. 3B, the first battery cell 110 has slightly swollen, such that the first conductive label 120 is broken but the second conductive label 130 and the third conductive label 140 are not broken. At this time, the first voltage V1 has a low logic level (e.g., a logic "0"), and the second voltage V2 and the third voltage V3 have high logic levels. In response to the second combination, the processor 286 can set the charging voltage VG to a first level (e.g., 4.4V).

Figure 3C:
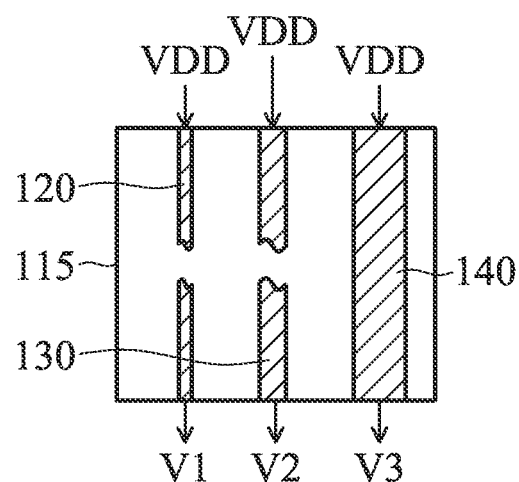
FIG. 3C is a diagram of a third combination of conductive labels according to an embodiment of the invention.

FIG. 3C is a diagram of the third combination of the conductive labels according to an embodiment of the invention. In the embodiment of FIG. 3C, the first battery cell 110 has moderately swollen, such that the first conductive label 120 and the second conductive label 130 are broken but the third conductive label 140 is not broken. At this time, the first voltage V1 and the second voltage V2 have low logic levels, and the third voltage V3 has a high logic level. In response to the third combination, the processor 286 can set the charging voltage VG to a second level (e.g., 4.3V).

Figure 3D:
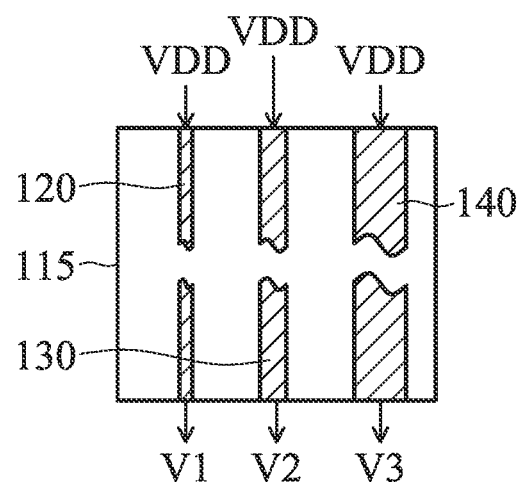
FIG. 3D is a diagram of a fourth combination of conductive labels according to an embodiment of the invention.

FIG. 3D is a diagram of the fourth combination of the conductive labels according to an embodiment of the invention. In the embodiment of FIG. 3D, the first battery cell 110 has seriously swollen, the first conductive label 120, the second conductive label 130, and the third conductive label 140 are all broken. At this time, the first voltage V1, the second voltage V2, and the third voltage V3 all have low logic levels. In response to the fourth combination, the processor 286 can set the charging voltage VG to a third level (e.g., 4.2V).

Generally, when the swelling of the first battery cell 110 becomes more serious, the wider conductive label may break. In response, the processor 286 can reduce the voltage level of the charging voltage VG correspondingly, so as to mitigate the swelling of the first battery cell 110 and extend its service life.

Figure 4:
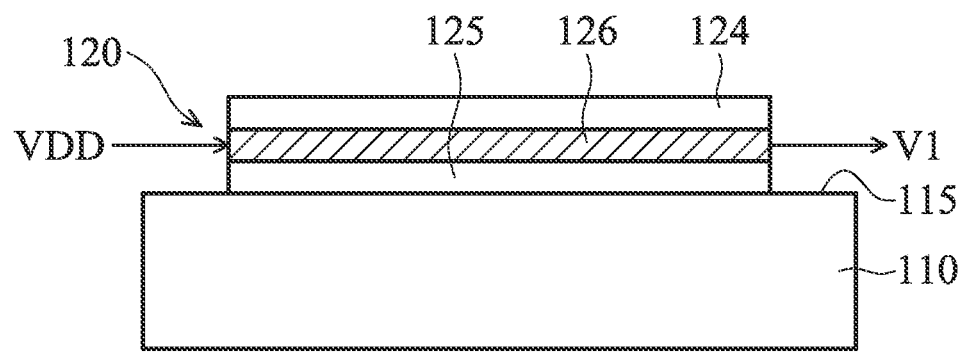
FIG. 4 is a partial sectional view of an electronic device according to an embodiment of the invention.

FIG. 4 is a partial sectional view of the electronic device 200 according to an embodiment of the invention. In the embodiment of FIG. 4, the first conductive label 120 includes a PET (Polyethylene Terephthalate) layer 124, an insulation glue layer 125, and a conductive layer 126. The conductive layer 126 is disposed between the PET layer 124 and the insulation glue layer 125. The insulation glue layer 125 is adhered to the first nonconductive housing 115. For example, the data of safety specification relative to the first battery cell 110 may be printed on the PET layer 124. The conductive layer 126 is configured to receive the supply voltage VDD and output the first voltage V1. However, the invention is not limited thereto. In alternative embodiments, the PET layer 124, the insulation glue layer 125, and the conductive layer 126 may be implemented with transparent materials if the data of safety specification relative to the first battery cell 110 are printed on the first nonconductive housing 115. It should be noted that the second conductive label 130 and the third conductive label 140 have identical or corresponding structures to that of the first conductive label 120, and they will not be introduced again herein.

Figure 5:
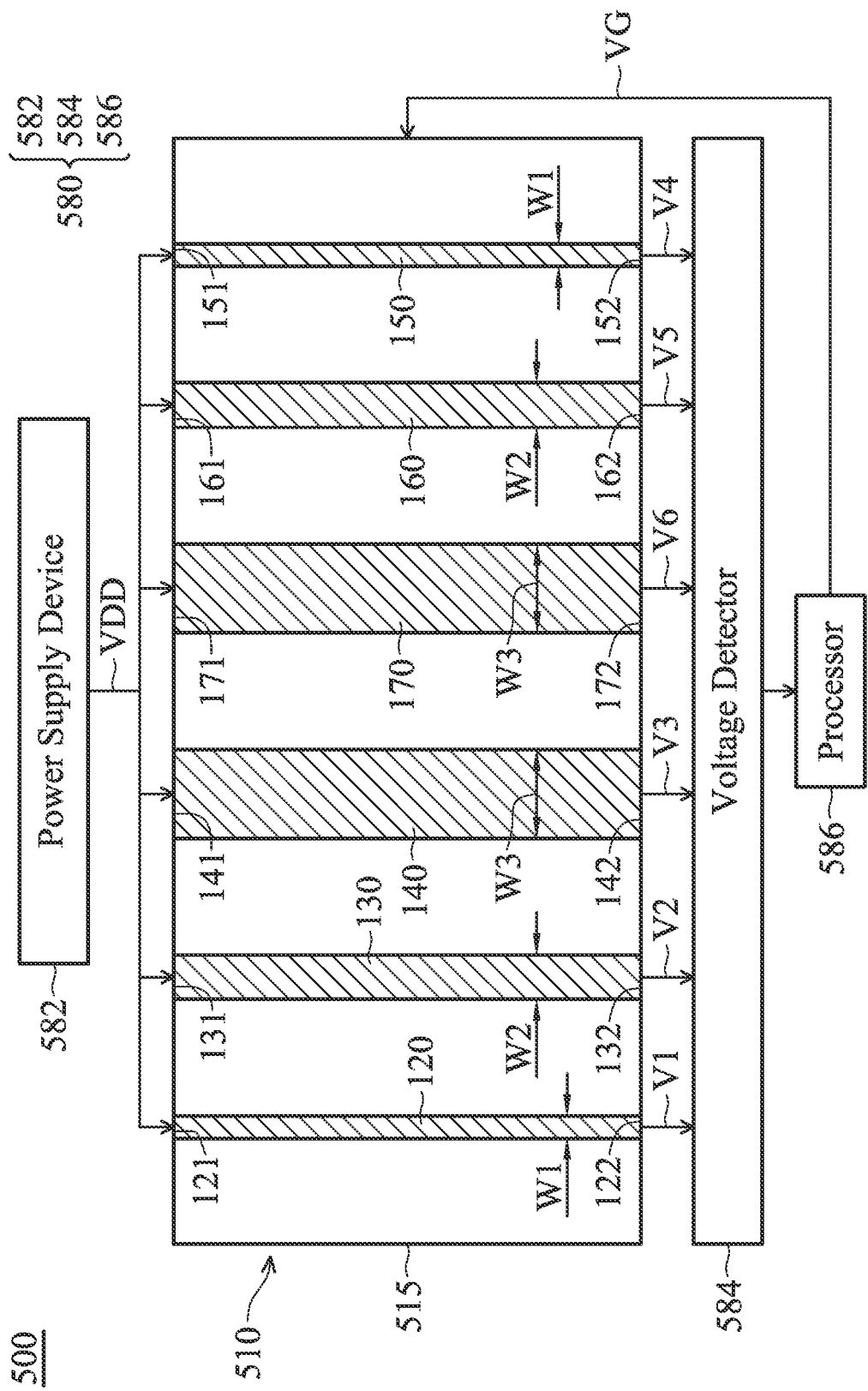
FIG. 5 is a diagram of an electronic device according to an embodiment of the invention.

FIG. 5 is a diagram of an electronic device 500 according to an embodiment of the invention. FIG. 5 is similar to FIG. 2. In the embodiment of FIG. 5, the electronic device 500 further includes a fourth conductive label 150, a fifth conductive label 160, and a sixth conductive label 170, which are all disposed on a first nonconductive housing 515 of a first battery cell 510. For example, the fourth conductive label 150 may correspond to the first conductive label 120, and they may have the same widths W1. The fifth conductive label 160 may correspond to the second conductive label 130, and they may have the same widths W2. The sixth conductive label 170 may correspond to the third conductive label 140, and they may have the same widths W3. In addition, a BMU 580 of the electronic device 500 includes a power supply device 582, a voltage detector 584, and a processor 586. The power supply device 582 can output a supply voltage VDD to a first terminal 121 of the first conductive label 120, a first terminal 131 of the second conductive label 130, a first terminal 141 of the third conductive label 140, a first terminal 151 of the fourth conductive label 150, a first terminal 161 of the fifth conductive label 160, and a first terminal 171 of the sixth conductive label 170. The voltage detector 584 can detect a first voltage V1 at a second terminal 122 of the first conductive label 120, a second voltage V2 at a second terminal 132 of the second conductive label 130, a third voltage V3 at a second terminal 142 of the third conductive label 140, a fourth voltage V4 at a second terminal 152 of the fourth conductive label 150, a second voltage V5 at a second terminal 162 of the fifth conductive label 160, and a sixth voltage V6 at a second terminal 172 of the sixth conductive label 170. Next, the processor 586 can generate the charging voltage VG and adjust its voltage level according to the first voltage V1, the second voltage V2, the third voltage V3, the fourth voltage V4, the fifth voltage V5, and the sixth voltage V6. Other features of the electronic device 500 of FIG. 5 are similar to those of the electronic device 200 of FIG. 2. According, the two embodiments can achieve similar levels of performance.

Specifically, the processor 586 can determine whether any of the first conductive label 120, the second conductive label 130, the third conductive label 140, the fourth conductive label 150, the fifth conductive label 160, the sixth conductive label 170 is broken by analyzing the first voltage V1, the second voltage V2, the third voltage V3, the fourth voltage V4, the fifth voltage V5, and the sixth voltage V6. In some embodiments, the processor 586 further performs a double-judgment procedure to reduce the probability of misjudgment, and it will be described as follows. The so-called "double judgment procedure" means that only if two conductive labels with the same widths output voltages at low logic levels concurrently, it can be determined that these conductive labels are broken. If a conductive label outputs a voltage at a low logic level but another conductive label outputs another voltage at a high logic level, it can be considered that these conductive labels are not broken (i.e., more stringent criteria are applied).

In the beginning, when the first voltage V1 of the first conductive label 120 and the fourth voltage V4 of the fourth conductive label 150 both have low logic levels, the processor 586 can determine that the first battery cell 110 has slightly swollen, thereby reducing the charging voltage VG from the original level to the first level (corresponding to the embodiment of FIG. 3B). Conversely, if any of the first voltage V1 and the fourth voltage V4 has a high logic level, the charging voltage VG will be kept at the original level (because only one of the first conductive label 120 and the fourth conductive label 150 is broken, it does not pass the test of double-judgment procedure).

Next, when the second voltage V2 of the second conductive label 130 and the fifth voltage V5 of the fifth conductive label 160 both have low logic levels, the processor 586 can determine that the first battery cell 110 has moderately swollen, thereby reducing the charging voltage VG from the first level to the second level (corresponding to the embodiment of FIG. 3C). Conversely, if any of the second voltage V2 and the fifth voltage V5 has a high logic level, the charging voltage VG will be kept at the first level (because only one of the second conductive label 130 and the fifth conductive label 160 is broken, it does not pass the test of double-judgment procedure).

Finally, when the third voltage V3 of the third conductive label 140 and the sixth voltage V6 of the sixth conductive label 170 both have low logic levels, the processor 586 can determine that the first battery cell 110 has seriously swollen, thereby reducing the charging voltage VG from the second level to the third level (corresponding to the embodiment of FIG. 3D). Conversely, if any of the third voltage V3 and the sixth voltage V6 has a high logic level, the charging voltage VG will be kept at the second level (because only one of the third conductive label 140 and the sixth conductive label 170 is broken, it does not pass the test of double-judgment procedure).

Figure 6:
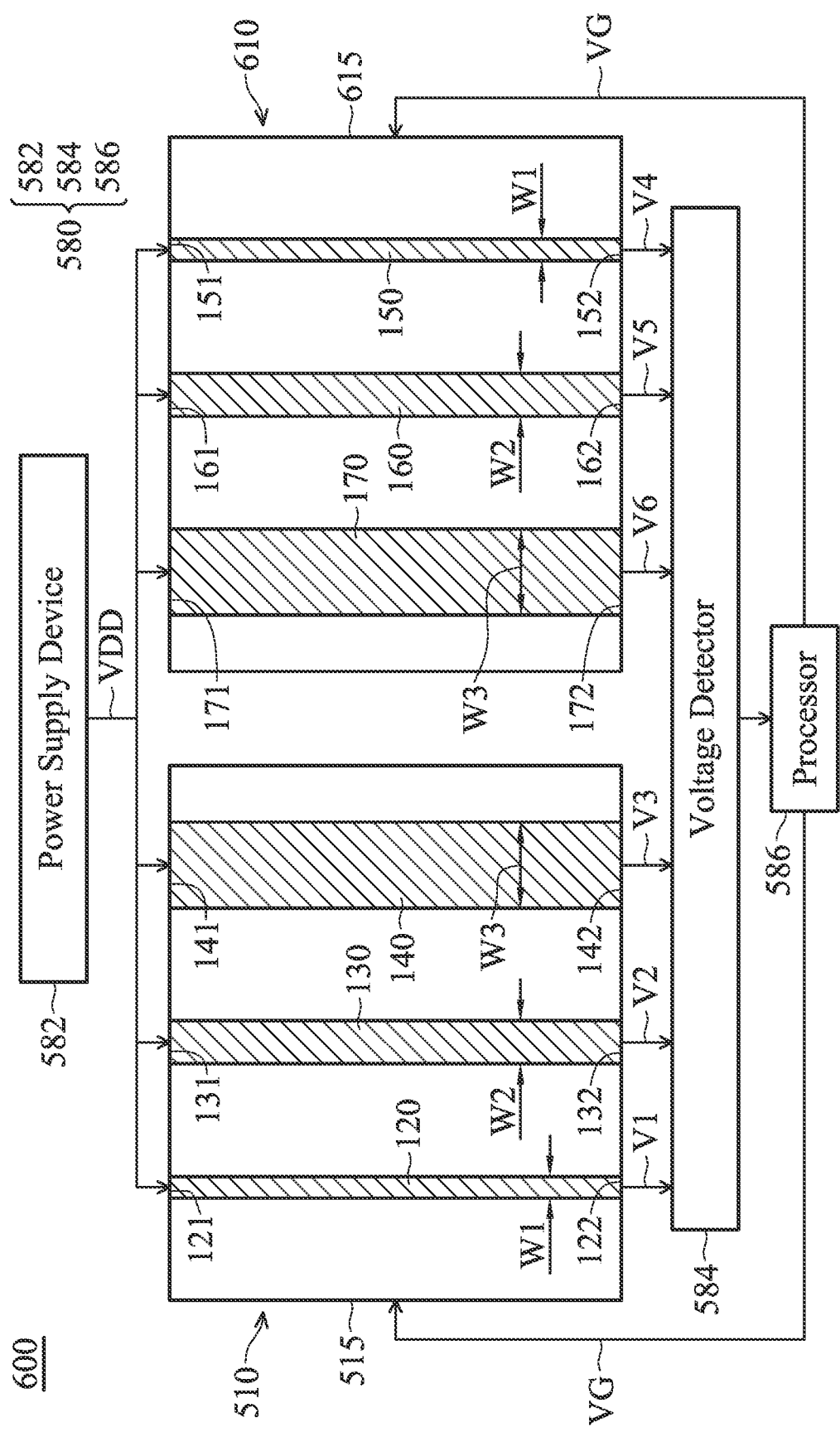
FIG. 6 is a diagram of an electronic device according to an embodiment of the invention.

FIG. 6 is a diagram of an electronic device 600 according to an embodiment of the invention. FIG. 6 is similar to FIG. 5. In the embodiment of FIG. 6, the electronic device 600 further includes a second battery cell 610, which includes a second nonconductive housing 615. The fourth conductive label 150, the fifth conductive label 160, and the sixth conductive label 170 are all disposed on the second nonconductive housing 615 of a second battery cell 610. The second battery cell 610 may be independent of the first battery cell 110. The processor 586 can determine the voltage level of the charging voltage VG by analyzing the states of the first conductive label 120, the second conductive label 130, the third conductive label 140, the fourth conductive label 150, the fifth conductive label 160, and the sixth conductive label 170. To reduce the probability of misjudgments, the processor 586 may also adopt the aforementioned double-judgment procedure. In alternative embodiments, the electronic device 600 includes more battery cells and more conductive labels, whose arrangements are not limited. Other features of the electronic device 600 of FIG. 6 are similar to those of the electronic device 500 of FIG. 5. According, the two embodiments can achieve similar levels of performance.

Figure 7:
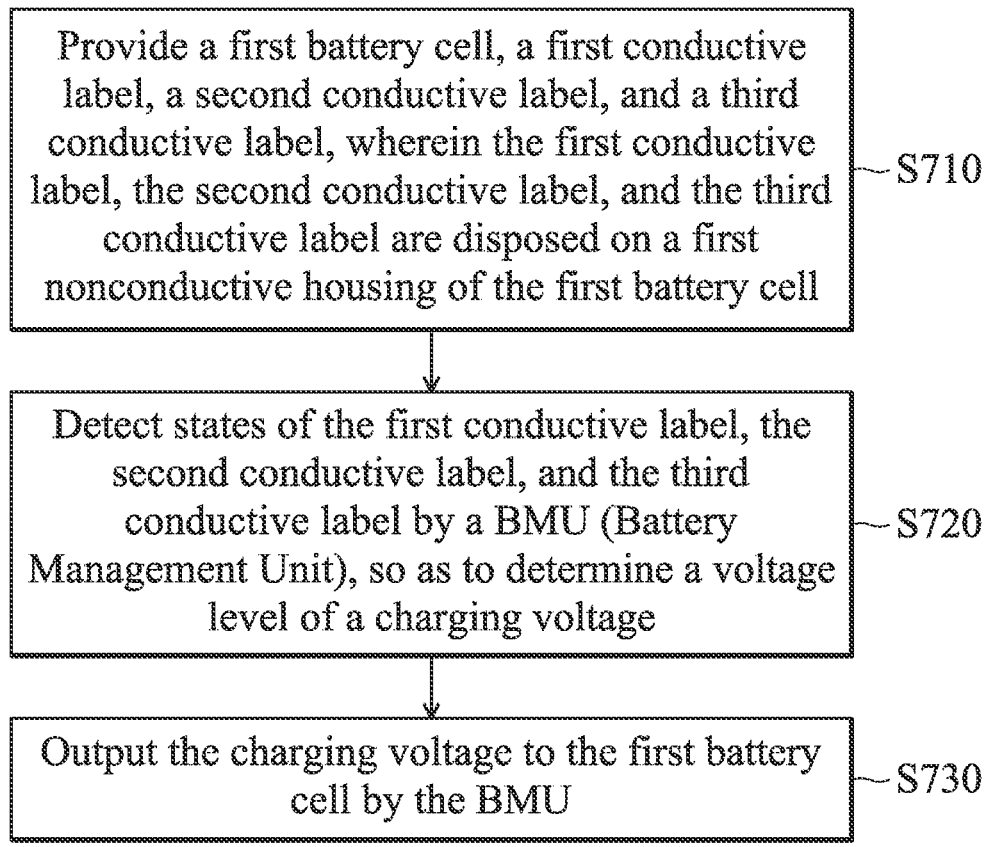
FIG. 7 is a flowchart of a method for suppressing battery swelling according to an embodiment of the invention.

FIG. 7 is a flowchart of a method for suppressing battery swelling according to an embodiment of the invention. The aforementioned control method includes the following steps. In step S710, a first battery cell, a first conductive label, a second conductive label, and a third conductive label are provided. The first conductive label, the second conductive label, and the third conductive label are disposed on a first nonconductive housing of the first battery cell. In step S720, the states of the first conductive label, the second conductive label, and the third conductive label are detected by a BMU (Battery Management Unit), so as to determine a voltage level of a charging voltage. In step S730, the charging voltage is outputted to the first battery cell by the BMU. It should be understood that the above steps are not required to be performed in order, and every feature of the embodiments of FIGS. 1 to 6 may be applied to the control method of FIG. 7.

The invention proposes a novel electronic device and a method thereof for effectively suppressing the non-ideal swelling of the battery cell. Generally, the invention has at least the advantages of improving safety, reducing manufacturing costs, and extending battery life, and therefore it is suitable for application in a variety of mobile communication devices.

Note that the above voltage levels and element parameters are not limitations of the invention. A designer can adjust these settings according to different requirements. The electronic device and control method of the invention are not limited to the configurations of FIGS. 1-7. The invention may merely include any one or more features of any one or more embodiments of FIGS. 1-7. In other words, not all of the features displayed in the figures should be implemented in the electronic device and its method of the invention.

The method of the invention, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. An electronic device for suppressing battery swelling, comprising:
    a first battery cell, comprising a first nonconductive housing;
    a first conductive label;
    a second conductive label;
    a third conductive label, wherein the first conductive label, the second conductive label, and the third conductive label are disposed on the first nonconductive housing; and
    a BMU (Battery Management Unit), outputting a charging voltage to the first battery cell, wherein the BMU determines a voltage level of the charging voltage by detecting states of the first conductive label, the second conductive label, and the third conductive label;
    wherein the BMU comprises:
    a power supply device, outputting a supply voltage to the first conductive label, the second conductive label, and the third conductive label;
    a voltage detector, detecting a first voltage from the first conductive label, a second voltage from the second conductive label, and a third voltage from the third conductive label; and
    a processor, generating the charging voltage according to the first voltage, the second voltage, and the third voltage;
    wherein the processor determines whether any of the first conductive label, the second conductive label, and the third conductive label is broken by analyzing the first voltage, the second voltage, and the third voltage;
    wherein if none of the first conductive label, the second conductive label, and the third conductive label is broken, the charging voltage has an original level;
    wherein if the first conductive label is broken but the second conductive label and the third conductive label are not broken, the charging voltage is reduced to a first level;
    wherein if the first conductive label and the second conductive label are broken but the third conductive label is not broken, the charging voltage is reduced to a second level;
    wherein the first level is lower than the original level, and the second level is lower than the first level.

2. The electronic device as claimed in claim 1, wherein the first conductive label, the second conductive label, and the third conductive label have the same lengths and different widths.

3. The electronic device as claimed in claim 1, wherein if the first conductive label, the second conductive label, and the third conductive label are all broken, the charging voltage is reduced to a third level.

4. The electronic device as claimed in claim 1, wherein each of the first conductive label, the second conductive label, and the third conductive label comprises:
    a PET (Polyethylene Terephthalate) layer;
    an insulation glue layer; and
    a conductive layer, disposed between the PET layer and the insulation glue layer, wherein the insulation glue layer is adhered to the first nonconductive housing.

5. The electronic device as claimed in claim 1, further comprising:
    a fourth conductive label, corresponding to the first conductive label;
    a fifth conductive label, corresponding to the second conductive label; and
    a sixth conductive label, corresponding to the third conductive label, wherein the fourth conductive label, the fifth conductive label, and the sixth conductive label are disposed on the first nonconductive housing.

6. The electronic device as claimed in claim 5, wherein the BMU performs a double-judgment procedure and determines the voltage level of the charging voltage by further detecting states of the fourth conductive label, the fifth conductive label, and the sixth conductive label.

7. The electronic device as claimed in claim 1, further comprising:
    a second battery cell, comprising a second nonconductive housing;
    a fourth conductive label, corresponding to the first conductive label;
    a fifth conductive label, corresponding to the second conductive label; and
    a sixth conductive label, corresponding to the third conductive label, wherein the fourth conductive label, the fifth conductive label, and the sixth conductive label are disposed on the second nonconductive housing.

8. The electronic device as claimed in claim 7, wherein the BMU performs a double-judgment procedure and determines the voltage level of the charging voltage by further detecting states of the fourth conductive label, the fifth conductive label, and the sixth conductive label.

9. A method for suppressing battery swelling, comprising the steps of:
    providing a first battery cell, a first conductive label, a second conductive label, and a third conductive label, wherein the first conductive label, the second conductive label, and the third conductive label are disposed on a first nonconductive housing of the first battery cell;
    detecting states of the first conductive label, the second conductive label, and the third conductive label by a BMU (Battery Management Unit), so as to determine a voltage level of a charging voltage;
    outputting the charging voltage to the first battery cell by the BMU;
    outputting a supply voltage to the first conductive label, the second conductive label, and the third conductive label;
    detecting a first voltage from the first conductive label, a second voltage from the second conductive label, and a third voltage from the third conductive label;
    generating the charging voltage according to the first voltage, the second voltage, and the third voltage;
    determining whether any of the first conductive label, the second conductive label, and the third conductive label is broken by analyzing the first voltage, the second voltage, and the third voltage;

if none of the first conductive label, the second conductive label, and the third conductive label is broken, setting the charging voltage to an original level;

if the first conductive label is broken but the second conductive label and the third conductive label are not broken, reducing the charging voltage to a first level; and if the first conductive label and the second conductive label are broken but the third conductive label is not broken, reducing the charging voltage to a second level;

wherein the first level is lower than the original level, and the second level is lower than the first level.

\* \* \* \* \*